No. 646,670. Patented Apr. 3, 1900.
J. E. SWENDEMAN.
STEAM TRAP.
(Application filed Dec. 15, 1899.)
(No Model.) 2 Sheets—Sheet 1.
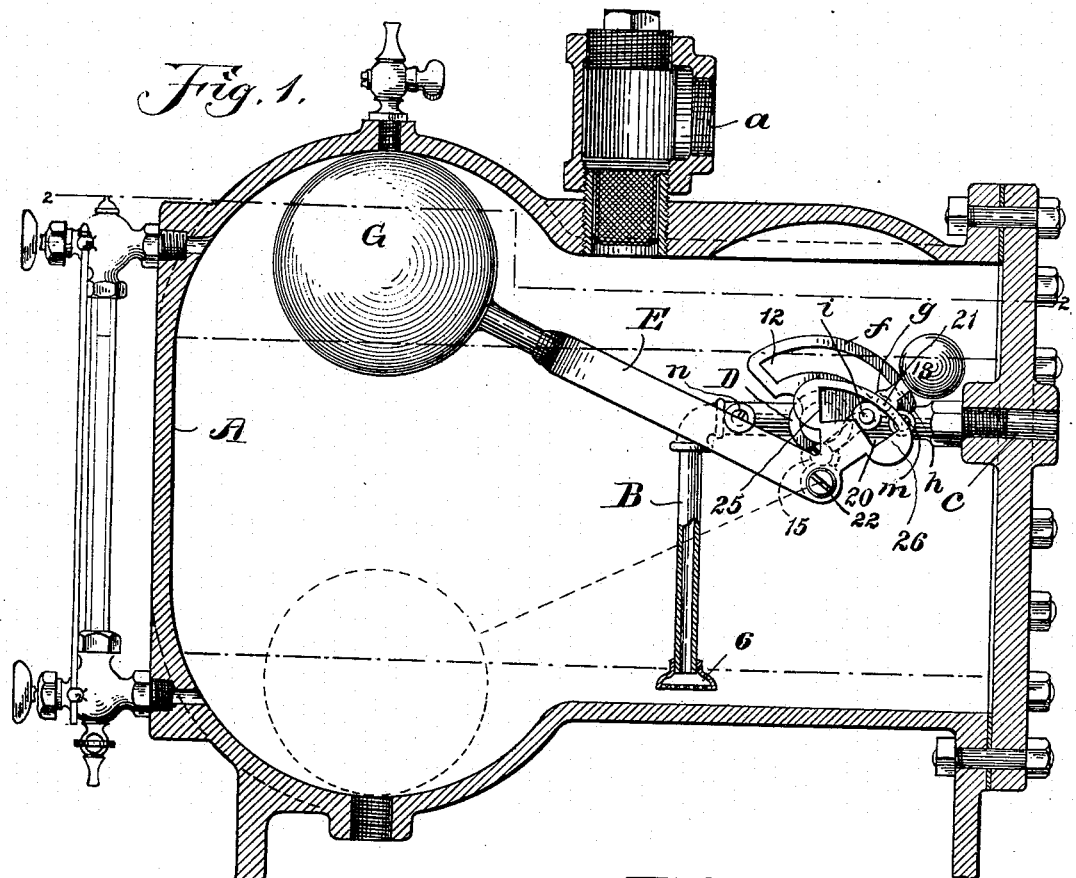
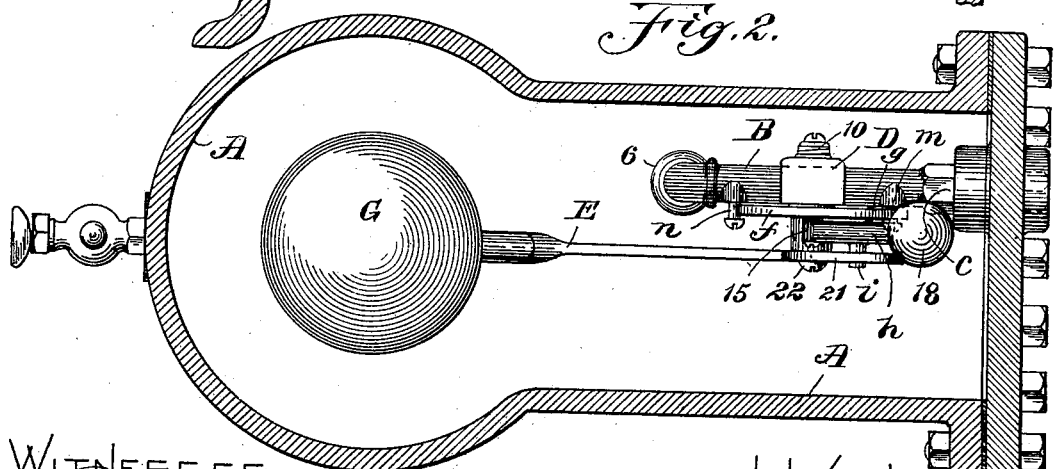
Witnesses:
Henry Marsh.
L. T. Basford.
Inventor.
Joseph E. Swendeman,
by Teschemacher
Atty.

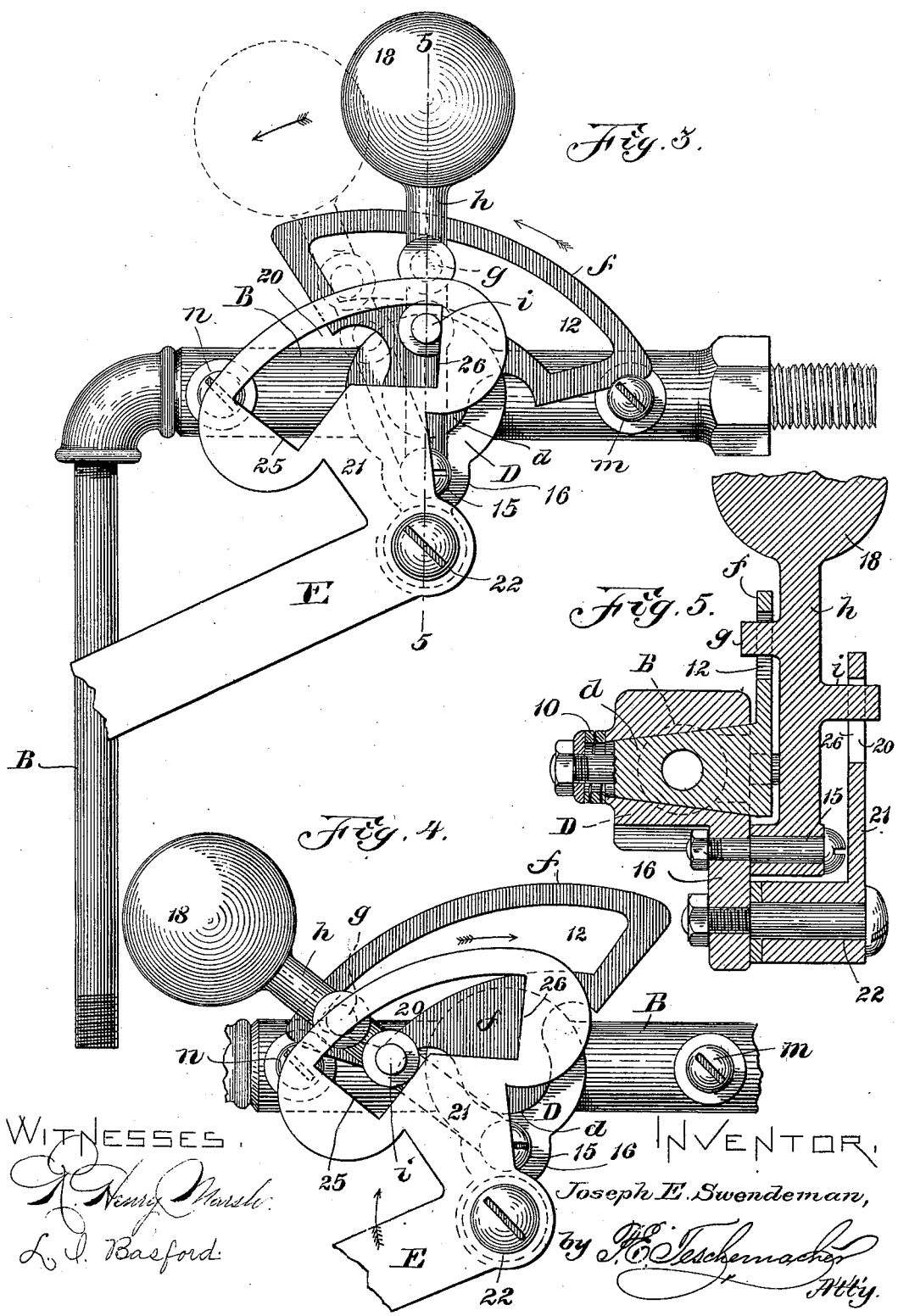

UNITED STATES PATENT OFFICE.

JOSEPH E. SWENDEMAN, OF BOSTON, MASSACHUSETTS.

STEAM-TRAP.

SPECIFICATION forming part of Letters Patent No. 646,670, dated April 3, 1900.

Application filed December 15, 1899. Serial No. 740,456. (No model.)

*To all whom it may concern:*

Be it known that I, JOSEPH E. SWENDEMAN, a citizen of the United States, residing at Boston, in the county of Suffolk and State of Massachusetts, have invented certain Improvements in Automatic Valve Mechanism for Steam-Traps, of which the following is a specification.

My invention relates to steam-traps; and it consists in certain novel combinations of parts and details of construction, as will be hereinafter described, and pointed out in the claims.

In the accompanying drawings, Figure 1 is a central sectional elevation of a steam-trap embodying my invention, the valve-operating mechanism being shown in the position that it occupies at the moment the discharge-valve is opened. Fig. 2 is a sectional plan of the discharge-valve and its operating mechanism, taken on the line 2 2 of Fig. 1. Fig. 3 is an enlarged diagram showing the valve mechanism in a central position, the weighted tumbling-arm being in a vertical position and just ready to fall over to the left-hand side. Fig. 4 is a similar diagram showing the position of the valve mechanism when the float has reached its lowest position and the discharge-valve has been closed. Fig. 5 is a transverse section through the discharge-valve on the line 5 5 of Fig. 3.

In the said drawings, A represents the shell or body of the trap, and $a$ the inlet-pipe, through which the steam and water of condensation from the radiators of a heating plant or other source pass into the trap.

B is the outlet-pipe, which enters the trap at $c$ and extends nearly to its bottom, as shown, where it is preferably provided with a strainer 6, the bottom of this pipe being so located that it will be at all times beneath the surface of the water in the trap.

The outer end of the discharge-pipe B is to be connected with a pipe (not shown) through which the water from the trap passes to a hot-well, tank, or other receiver.

The upper or horizontal portion of the pipe B is provided with a valve D, having a tapering plug $d$, held up to its seat by a screw and a spring-washer 10, said plug having a straight aperture therethrough, as shown in Fig. 5. The larger end of the plug $d$ has secured to it an upwardly-extending segment-shaped rocker-arm $f$, provided with a curved slot 12, within which fits a pin $g$, projecting from one side of a tumbling-arm $h$, having its lower end pivoted at 15 to an extension 16 of the shell of the valve D and carrying at its upper end a weight 18. From the opposite side of the tumbling-arm $h$, below the pin $g$, projects another pin $i$, which extends into a curved slot 20, formed in the shorter upright arm 21 of a long lever E, pivoted at 22 to the extension 16 of the valve-shell, said lever being furnished at its outer end with a hollow float G, adapted to rest upon the surface of the water in the trap and rise and fall therewith, thereby rocking or oscillating the slotted arm 21 around the pivot 22.

$m$ $n$ are stop-pins for limiting the movement of the rocker-arm $f$ of the valve-plug $d$, the valve being open when the arm $f$ is rocked over into contact with the stop $m$ and closed when the arm $f$ is rocked over in the opposite direction into contact with the stop $n$.

The operation of the above-described trap is as follows: The parts being in the position shown in Fig. 4, with the water at its lowest level and the valve $d$ closed, as the water of condensation begins to fill the trap the float G rises, rocking the arm 21 and causing the end 25 of the slot 20 to act on the pin $i$ of the weighted tumbling-arm $h$ until the latter is brought into a vertical position, which occurs immediately before the water reaches its highest level. As soon as the tumbling-arm is carried over the center by a slight additional rise of the float it will fall over to the right, causing its pin $g$ to strike the right-hand end of the slot 12 of the rocker-arm $f$, which arm is then carried, with the weighted tumbling-arm, over into the position shown in Fig. 1, when it will come into contact with the stop-pin $m$, by which the movement of the parts is arrested, the valve D being then wide open. The pressure of the steam now causes the water to pass up through the discharge-pipe B and out of the trap without any escape of steam, the float falling with the water until the end 26 of the slot 20 of the arm 21 is brought into contact with the pin $i$ of the arm $h$, which is then moved upward into the position shown in Fig. 3, and by a farther descent of the float carried past the center, which causes it to fall over to the left-hand side, when its pin $g$ will strike the left-hand end of the slot 12 of the rocker-arm $f$ and carry said arm over to the left until it strikes the stop-pin $n$, which thus limits the movement of the parts in that direction, the valve being then closed. The water of condensation then again begins to fill the trap and the operation continues as before.

It will be obvious that the water must rise in the trap to a certain predetermined level before the mechanism controlled by the float will carry the weighted tumbling-arm beyond the center to cause it to automatically throw the valve open, and that when open it will be impossible for the valve to close until the water has descended to the desired low level, which is always above the bottom of the outlet-pipe, when the valve will be automatically closed by the falling over of the tumbling-arm in the opposite direction and must absolutely remain so without possibility of being opened until the water has again risen to its high level, and in this manner a free periodical discharge of the water is automatically effected, causing the trap to be rapidly emptied of the accumulated water of condensation without loss or escape of steam, thereby effecting a material saving in fuel, it being impossible for any steam to escape through the outlet-pipe and valve, as there will always be sufficient water in the bottom of the trap when the valve is closed to cover the bottom of said pipe.

What I claim as my invention, and desire to secure by Letters Patent, is—

1. A steam-trap comprising a shell or body having an inlet, a discharge-pipe having a valve, a slotted or forked arm for said valve, a weighted tumbling-arm having pins or projections on its opposite sides, one of which engages the slot or fork in said tumbling-arm, and a pivoted float-lever having a forked or slotted arm engaging the outer pin or projection on the tumbling-arm; substantially as described.

2. A steam-trap comprising, a shell or body, a discharge-pipe therein, a turning valve in said discharge-pipe and having a slotted or forked operating-arm at one end, a weighted tumbling-arm having a pin or projection on one side to alternately engage the ends of the said operating-arm, and a pin or projection on its opposite side, and a float-lever having a forked or slotted arm to engage with its ends the last-named pin or projection.

3. In a steam-trap, the combination with the shell or body provided with an outlet-pipe adapted to have its lower end at all times beneath the surface of the water in the trap, of a rotary plug-valve in said outlet-pipe having its plug provided with a slotted rocker-arm, a lever provided with a float and having a slot in its shorter arm, a weighted tumbling-arm pivoted at its lower end and located between the rocker-arm of the valve and the slotted arm of the float-lever, said tumbling-arm being provided on one side with a pin engaging the slot of the valve-rocker and on its opposite side with a second pin engaging the slot of the float-lever, whereby as said float-lever rises and falls the tumbling-arm will be raised and carried beyond the center alternately in opposite directions to act as it falls upon the rocker-arm of the valve, to open or close the latter, and stops for limiting the movement of the tumbling-arm and valve, substantially as described.

4. A steam-trap comprising, a shell or casing, a discharge-pipe provided with a rotary plug-valve having a forked or slotted arm at one end, a tumbling-arm pivoted below the plug-valve and having a pin or projection on one side to engage the ends of the valve-arm, and also having a similar arm or projection on the opposite side, and a float-lever pivoted below the axis of the tumbling-arm and having a slotted or forked end to engage the last-named pin or projection.

Witness my hand this 13th day of December, A. D. 1899.

JOSEPH E. SWENDEMAN.

In presence of—
P. E. TESCHEMACHER,
ROSE M. RILEY.